May 17, 1932. H. C. TERRELL ET AL 1,858,288
BATTERY TERMINAL CONNECTION
Filed Dec. 4, 1928
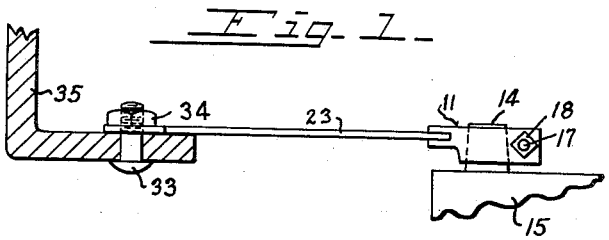
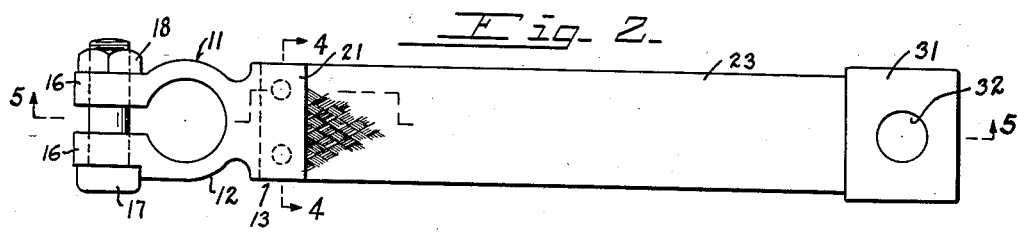
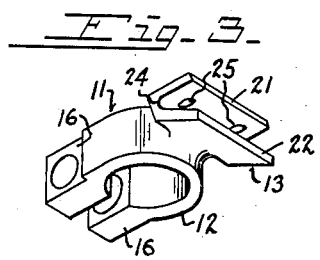 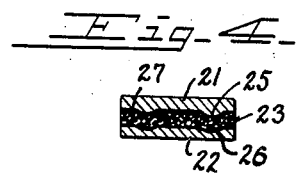
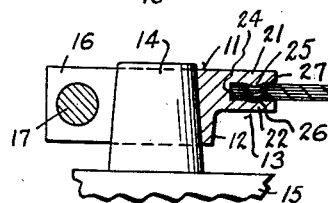 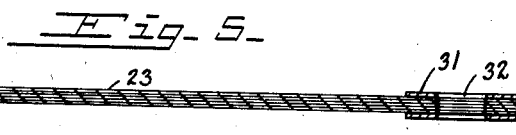
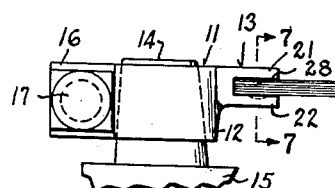
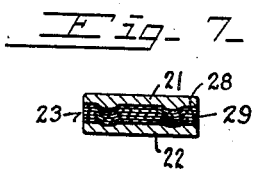
INVENTORS:
Harold C. Terrell
Frank A. Kerkhoff Patented May 17, 1932

1,858,288

UNITED STATES PATENT OFFICE

HAROLD C. TERRELL AND FRANK A. KERKHOFF, OF CINCINNATI, OHIO, ASSIGNORS TO THE OHIO PARTS COMPANY, OF CINCINNATI, OHIO, A CORPORATION OF OHIO

BATTERY TERMINAL CONNECTION

Application filed December 4, 1928. Serial No. 323,745.

Our improved battery terminal connection is shown with a flat electric conductor, such as laminated copper strips or a flat woven wire structure, for use as a ground connection for storage batteries for automobiles, aeroplanes, motor boats or other purposes.

It is the object of our invention to provide a connection of this character which comprises a casting including an attaching portion for the battery terminal, and a clamping portion comprising a pair of lips extending from said attaching portion and forming a mouth whose base is adjacent to said attaching portion, and whose lips extend away from said attaching portion for clampingly receiving the flat electric conductor; and, further, to provide the proximate faces of said lips with a projection and a recess so arranged that when the lips are pressed together to clamp the flat electric conductor, the projection causes the flat electric conductor to be indented into the mating recess for securely mechanically locking the conductor to the attaching portion.

The invention will be further readily understood from the following description and claims, and from the drawings, in which latter:

Fig. 1 is a side elevation of our improved device shown applied in forming a ground connection for a storage battery, for instance of an automobile.

Fig. 2 is a plan view of our improved device.

Fig. 3 is a perspective view of the casting of our improved device, showing the lips in normally separated relation.

Fig. 4 is a cross-section of our improved device, taken on the line 4—4 of Fig. 2.

Fig. 5 is a longitudinal section of the same, taken on the irregular line 5—5 of Fig. 2, showing the same clamped to a storage battery, partly broken away.

Fig. 6 is a side elevation of our improved device employing electro-conductive stripping; and, Fig. 7 is a cross-section of the same, taken on the line 7—7 of Fig. 6.

Our improved device comprises a head 11, which includes an attaching portion 12 exemplified as a split clamping ring, and a clamping portion 13. The attaching ring is arranged to be received about the terminal post 14 of an electric storage battery 15. The attaching ring comprises clamping wings 16 provided with holes through which a bolt 17 is received, the bolt being threaded in a nut 18, the parts being arranged for clamping the clamping wings toward one another for clamping the split attaching ring about the terminal post. Other attaching means may be employed.

The clamping portion 13 preferably comprises lips 21, 22, which are normally in spread relation, for instance as exemplified in Fig. 3. The complemental lips preferably spread toward their outer ends for forming a spread mouth, into which the end of a flat electric conductor 23 is readily received and presented toward the base 24 between said lips. This base extends crosswise of the attaching portion 12, with the mouth presented outwardly away from the attaching portion.

The end of the flat electric conductor is presented toward said base, and the flat electric conductor extends lengthwise at right angles to said base. The complemental inner faces of the lips are respectively provided with a projection 25 and a complemental recess 26, two of these projections and recesses being shown.

The head is preferably formed as a casting of electro-conductive material, brass, for example, being preferred, the projections 25 and the complemental recesses 26, as well as the spread form of the mouth of the clamping portion being formed in the casting, a suitable core being provided for the mouth of the clamping portion for forming said mouth and the proximate faces of the lips thereof.

The end of the flat electric conductor is passed into said mouth, the spread form of the lips enabling this to be readily done, and the lips are then pressed toward each other for clamping the end of the flat electric conductor in said mouth. This clamping action is performed with sufficient force for clamping the projections into the flat electric conductor, the displaced portion of which is thereby in turn pressed into the complemental recesses, for forming a tight mechanical and electrical connection between the flat electric conductor and the walls of the mouth, and thereby firmly securing the flat electric conductor and the clamping portion together and preveting any looseness in the joint between the same. The connection of the flat electric conductor between the lips may be additionally safeguarded by means of solder, shown at 27, the end of the flat electric conductor being securely soldered in said mouth.

The flat electric conductor is exemplified as a flat woven wire structure in Figs. 2, 4 and 5, or it may be composed of laminated thin strips 29 of electro-conductive material, such as copper, as exemplified in Figs. 6 and 7, or it may be any other usual form of electric conductor. The soldering preferably secures the ends of the braided wires together for securing any lose ends of the same.

The clamping action upon the lips of the clamping portion is preferably sufficiently great to firmly and rigidly secure the parts together. The projections and complemental recesses prevent slippage between the flat electric conductor and the clamping portion.

The end of the flat electric conductor is preferably pushed into the mouth until the extreme end of the flat electric conductor engages the base 24 of the mouth.

The laminated flat electric conductor is preferably also soldered in the mouth after the same is clamped in place, shown by the solder 28, the soldering being effective to further securely connect the laminations of the flat electric conductor and to further securely connect said flat electric conductor with the lips of said mouth, and insuring ready eletric conduction through said joint.

The free end of the flat electric conductor is provided with attaching means for attaching the same to a suitable frame part of the device in which the same is fastened. In the form shown in connection with the braided wire conductor the end of the braided wire conductor is provided with an enclosing band 31, soldered to the flat electric conductor, the flat electric conductor and the band being provided with a hole 32 for receiving a bolt 33, by means of which and a coacting nut 34 the flat electric conductor is clamped to a frame-part 35.

In the form employing the laminated strips shown in Figs. 6 and 7, the free ends of the laminated strips may be soldered together, as shown by the film 36 of solder, and be provided with a hole 37 through which the fastening bolt is received. These free ends may be suitably connected in other manner, as by spot welding.

The spread mouth in our improved device permits quick assembling of the flat electric conductor in the clamping portion of the head. Our improved device is simple in construction, is readily assembled, and the parts are assembled by means of a secure clamping joint for securely mechanically holding the parts together and forming an excellent electric connection, and locking the flat electric conductor in the clamped mouth, the coacting projections and recesses acting on the flat electric conductor to lock the flat electric conductor in the mouth.

Having thus fully described our invention, what we claim as new, and desire to secure by Letters Patent, is:

1. A battery terminal connection comprising a casting including an attaching portion for the battery terminal and a clamping portion for a flat conductor, said clamping portion including a mouth extending crosswise of said attaching portion and having a flat wall and a flat complemental lip, the base of said mouth being next to said attaching portion, said flat wall being perpendicular to the axis of said attaching portion and said flat lip extending from said base at an acute angle to said flat wall for forming said mouth wedge-shaped, and said lip arranged to be pressed toward said wall for clamping said flat conductor in said mouth.

2. A battery terminal connection comprising a flat electric conductor, a casting including an attaching portion for the battery terminal and a clamping portion for said flat conductor, said clamping portion including a mouth extending crosswise of said attaching portion and having a flat wall and a flat complemental lip, the base of said mouth being next to said attaching portion, said flat wall being perpendicular to the axis of said attaching portion and said flat lip extending from said base at an acute angle to said flat wall for forming said mouth wedge-shaped, and said lip arranged to be pressed flatwise toward said wall for clamping the end of said flat conductor in said mouth, with said flat electric conductor extending lengthwise perpendicular to the axis of said attaching portion, and said wall and said lip provided with complemental opposing projection and recess for pressing said flat conductor into said recess by said projection.

3. A battery terminal connection comprising a casting including an attaching portion and a clamping portion extending from said attaching portion, and a flat electric conductor, said clamping portion comprising a pair of flat cast lips whose inner ends form a base at said attaching portion, said lips extending perpendicularly to the axis of said attaching portion at relatively acute angles from said base and forming a mouth which is normally spread toward the outer ends of said lips to readily receive the end of said flat electric conductor presented toward the base of said mouth, with said flat electric conductor extending lengthwise perpendicular to the axis of said attaching portion, and the flat end of said flat electric conductor pressed between said lips and said electric conductor extending lengthwise perpendicular to the axis of said attaching portion.

In testimony whereof, we have hereunto signed our names.

HAROLD C. TERRELL.
FRANK A. KERKHOFF.